(12) United States Patent
Nakauchi et al.

(10) Patent No.: US 6,198,843 B1
(45) Date of Patent: Mar. 6, 2001

(54) METHOD AND APPARATUS FOR COLOR GAMUT MAPPING

(75) Inventors: Shigeki Nakauchi, 2-302, Ogasaki-jyutaku, 1-3, Uehara, Ogasaki-cho; Shiro Usui, 10-2-804, Nishihouwa, Yayoicho, both of Toyohasgi-shi, Aichi, 441; Masahiro Imamura, Toyokawa, all of (JP)

(73) Assignees: Toyo Ink Mfg. Co. Ltd., Tokyo; Shiro Usui; Shigeki Nakauchi, both of Toyohashi, all of (JP)

(*) Notice: Subject to any disclaimer, the term of this patent is extended or adjusted under 35 U.S.C. 154(b) by 0 days.

(21) Appl. No.: 08/923,659

(22) Filed: Sep. 4, 1997

(30) Foreign Application Priority Data

Mar. 7, 1997 (JP) .................................................. 9-053566

(51) Int. Cl.[7] .............................. G06K 9/00; G03F 3/08
(52) U.S. Cl. .......................................... 382/167; 358/518
(58) Field of Search .................................... 358/518, 521, 358/522, 523–524, 539, 501, 502, 503, 504, 512; 382/162, 163, 166, 167; 348/222, 223, 228, 210, 32, 33; 395/101, 109

(56) References Cited

U.S. PATENT DOCUMENTS

| | | | |
|---|---|---|---|
| 5,146,328 | * 9/1992 | Yamasaki et al. | 358/500 |
| 5,282,046 | * 1/1994 | Yamaguchi | 358/518 |
| 5,323,249 | * 6/1994 | Liang | 358/518 |
| 5,528,377 | * 6/1996 | Hutcheson | 358/520 |
| 5,606,432 | * 2/1997 | Ohtsuka et al. | 358/527 |
| 5,828,780 | * 10/1998 | Suzuki et al. | 382/167 |

OTHER PUBLICATIONS

Gentile, R. S., et al., "A Comparison of Tehnniques for Color Gamut Mismatch Copmpenstaion", *Journal of Imaging Technology*, vol. 16, No. 5, Oct. 1990, pp. 176–181.*

* cited by examiner

Primary Examiner—Madeleine Nguyen
(74) Attorney, Agent, or Firm—Ladas & Parry

(57) ABSTRACT

Colorimetric values such as L*a*b* are input from an input section to a color gamut mapping portion. A filtering process is performed on an image of the difference between the image sent by the input section and an image obtained as a result of bi-directional conversion at a converter section, and the input to the converter section is controlled so as to satisfy a requirement of minimizing an evaluation function which is defined by the sum of square norm of the filtered image as a whole and a value obtained by performing a thresholding process on norm of the difference in each pixel between images before and after the conversion at the converter section output by a gamut extracting section, obtained for the image as a whole. Device values satisfying predetermined conditions which are output of a first neural network of a first converter section to an image output section.

18 Claims, 13 Drawing Sheets

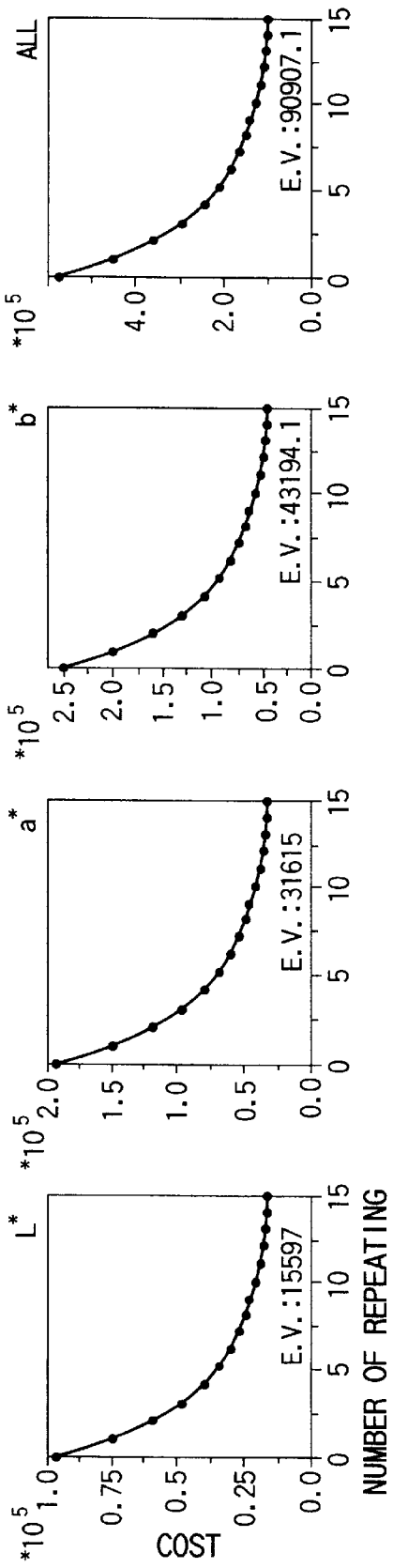
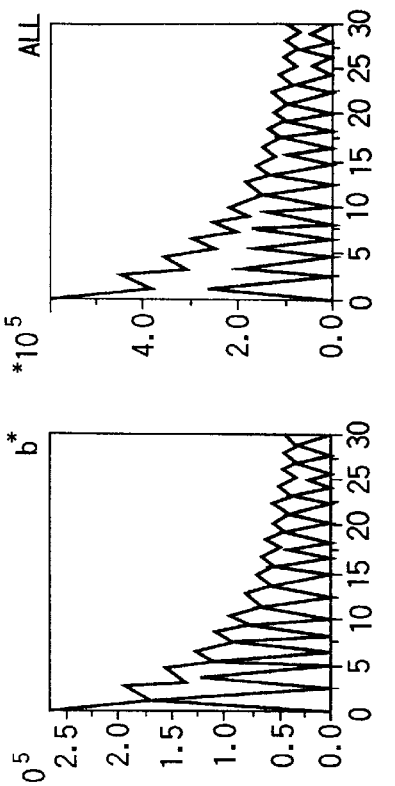
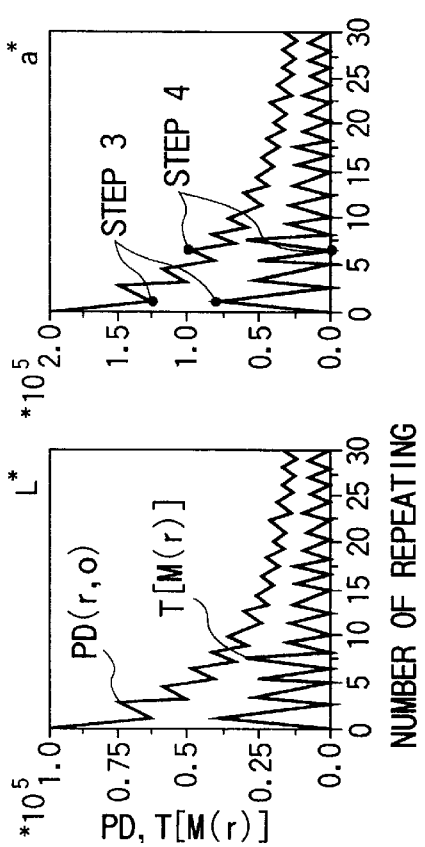
FIG. 11A, FIG. 11B, FIG. 11C, FIG. 11D
FIG. 12A, FIG. 12B, FIG. 12C, FIG. 12D
VARIATIONS OF PD(r,o), T[M(r)], AND COST ON OPTIMIZE PROCESSING

PRESENT INVENTION

REPRODUCED IMAGE

COLOR DIFFERENCE IMAGE (ΔEmean=3.30)

MINIMIZED—ΔE

REPRODUCED IMAGE

COLOR DIFFERENCE IMAGE (ΔEmean=2.46)

METHOD AND APPARATUS FOR COLOR GAMUT MAPPING

BACKGROUND OF THE INVENTION

The present invention relates to a method and apparatus for mapping all colors of an input image to a color gamut that can be reproduced by an output device in the field of color matching between different color reproduction devices. More particularly, the present invention relates to a method and apparatus for color gamut mapping in which an image can be reproduced with an optimum appearance by evaluating color matching using new color differences defined taking spatial frequency characteristics of the visual sense of a person.

The entire contents of Japanese Patent Application No. 9-53566 filed on Mar. 7, 1997 are incorporated herein by reference.

Various types of apparatuses have been developed as media for color reproduction including color displays, dye-sublimation printers, ink-jet printers, photographs, and commercial printers. In general, color gamuts which can be reproduced by such apparatuses significantly vary depending on the methods of color reproduction (color mixture), the methods for tone reproduction (halftone dot method, dithering, error diffusion method, etc), and differences in the spectral characteristics of the primary colors used. For example, it is known that the color gamut of a display is considerably wider than that of a dye-sublimation type printer. When color matching is performed between two apparatus having color gamuts of different sizes as described above, it is inevitable that some colors are unreproducible for one of the devices. Therefore, a problem arises in that it is necessary to find how to allow reproduce such colors out of such a color gamut at a device of interest.

In general, the visual system of a person who observes an image is characterized in that it has a difficulty in detecting a difference of a color from an original color for each picture element because it maintains the relationship between adjoining pixels (spatial frequency characteristics of an image) when such adjoining pixels have some complicated context an the case of a natural image. On the other hand, it detects a difference in one kind of color such as on a color chip more easily than it does on a natural image because the image of such a single color has constant frequency characteristics.

However, methods of mapping a color gamut proposed in the past pays no attention on such spatial frequency characteristics of the human visual system at all. Further, since those methods are used for color gamut mapping between an original image and a reproduced image on a pixel-by-pixel basis, a problem has been pointed out in that there is no way to provide a practical method of performing color gamut mapping on a natural image.

As described, it has been difficult to provide a method of performing color gamut mapping on a natural image properly, and there is a need for a more practical technique for performing color gamut mapping on an image that takes the spatial frequency characteristics of the human visual system into consideration.

BRIEF SUMMARY OF THE INVENTION

It is an object of the present invention to provide a method and apparatus for mapping a color gamut in which the relationship between adjoining pixels that are in some context such as in a natural image is maintained and in which the color difference is minimized for each pixel.

According to an aspect of the present invention, there is provided a method for color gamut mapping in order to reproduce a target image on a color reproduction device, the method comprising the steps of: performing bi-directional conversion between a colorimetric value of each pixel in the target image and a color separation value which represents a distribution at least three colors and depends on characteristics of the color reproduction device; determining whether or not a color of the each pixel can be reproduced by the color reproduction device according to a difference between the colorimetric value and colorimetric value after the bi-directional conversion; and optimizing the colorimetric value before the bi-directional conversion of the color determined as which can not be reproduced on the color reproduction device such that an evaluation function of the color is minimized, the evaluation function representing a perceptual difference of the determined color.

According to a second aspect of the present invention, there is provided an apparatus comprising:

input means for inputting signals each of which indicates a colorimetric value representing a color of each pixel of a target image; conversion means for performing bi-directional conversion between the colorimetric value input by the input means and a device value of a color reproduction device; color gamut extraction means for performing a thresholding process by calculating norm between the colorimetric value before the bi-directional conversion and the colorimetric value after the bi-directional conversion; filtering means for calculating square norm of an image obtained by performing a spatial frequency filtering process on an image of the difference between the reproduced image obtained by the bi-directional conversion performed by the conversion means and the target image; optimization means for adjusting the colorimetric value to be bi-directional converted so as to minimize an evaluation function expressed by the sum of an output of the color gamut extraction means and the square norm calculated by the filtering means; and output means for outputting signals representing an image which has been subjected to color gamut mapping by the optimization means.

According to a third aspect of the present invention, there is provided a computer-readable memory comprising: first instruction means; for causing a computer to perform a bi-directional conversion between a colorimetric value of each pixel in a target image and a color separation value which represents a distribution at least three colors and depends on characteristics of the color reproduction device; second instruction means for causing a computer to determine whether or not a color of the each pixel can be reproduced by the color reproduction device according to a difference between the colorimetric value and colorimetric value after the bi-directional conversion; and third instruction means for optimize the colorimetric value before the bi-directional conversion of the color determined as which can not be reproduced on the color reproduction device such that an evaluation function of the color is minimized, the evaluation function representing a perceptual difference of the determined color.

Specifically, when bi-directional color conversion is performed between an intermediate color system and color separation values (device values), if the colorimetric values of the input pixels are within the color gamut and, the bi-directional conversion results in identical mapping in which the pixels are mapped to the same points on the intermediate color system that are within allowable ranges of conversion errors. In case the pixels are out of the color gamut, conversion of the internal color system into the device values results in mapping onto values out of the range of the device values (which is, in general, the range from 0 to 255). For example, since the input and output characteristics of an output unit of a neural network are sigmoidal characteristics, the mapped values will be force into the range of the device values. As a result, when those values are remapped onto the intermediate color system, a point is mapped onto a location which is so significantly different from the original location that it goes out of the color gamut of the device of interest. Based on this, it is possible to determine how far is the point from the color gamut (or how deep is it in the color gamut). Further, color gamut mapping is properly achieved by adjusting the colorimetric values of a reproduced image such that the color difference in a pixel of interest between the original and the reproduced images minimizes an evaluation function which is defined by the sum of the color difference obtained taking the spatial frequency characteristics of the image into consideration and a function representing the distance of the dolor of each pixel from the color gamut.

Therefore, the method and apparatus for color gamut mapping based on the spatial frequency of an image according to the present invention effectively take advantage of the leaning capability of a neural network to achieve bi-directional conversion of device values of a color reproduction device of interest and actual colorimetric values regardless of whether the device represents colors using CMY values, CMYK values, or RGB values and to extract the color gamut of the color reproduction device of interest with sufficient accuracy.

In addition, color gamut mapping that accommodates the spatial frequency characteristics of an image can be achieved through an optimization process utilizing an evaluation function which is the sum of square norm of a first image obtained by filtering, and a second image obtained by a thresholding process performed on norm of colorimetric value images before and after the color conversion. The first image is obtained by filtering an image of the difference between a reproduced image obtained by the bi-directional conversion and the image of interest through a convolutional operation utilizing a point spread function (impulse response of a filter) designed to provide a suitable spatial frequency characteristics or multiplication on a frequency axis by coordinates conversion using fast Fourier transform (FFT)

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 11A through 11D illustrate a decrease in the value of an valuation function as a result of an optimization process at the optimization process portion shown in FIG. 1;

FIGS. 12A through 12D illustrate decreases in PD(r, o) and T[M(r)] as a result of an optimization process in the embodiment;

DETAILED DESCRIPTION OF THE INVENTION

Figure 1:
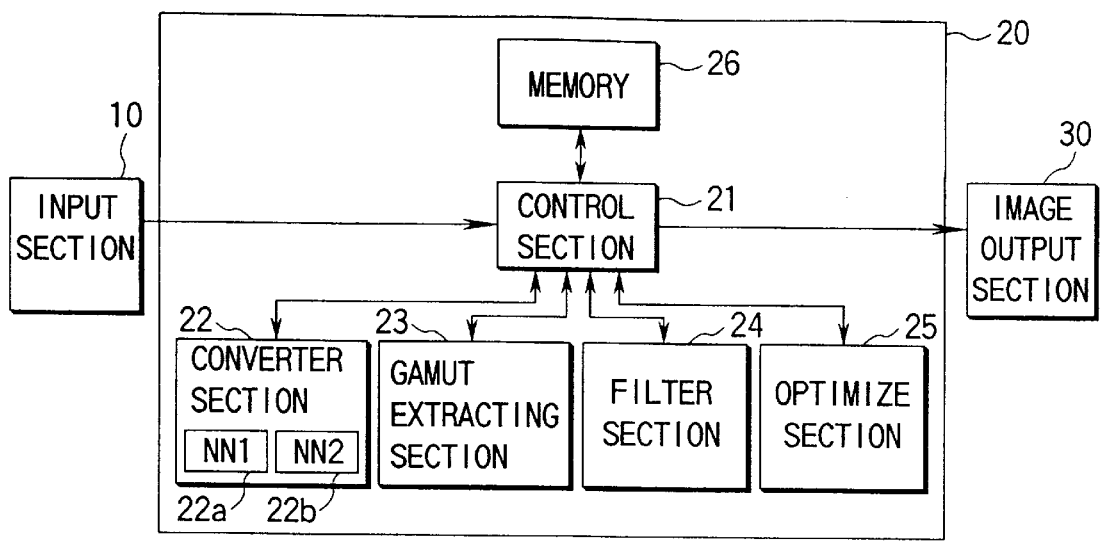
FIG. 1 is a block diagram of an apparatus for color gamut mapping according to an embodiment of the present invention which takes spatial frequency characteristics of an image into consideration.

First, a description will be made on the basic concept of an apparatus for color gamut mapping according to the present invention.

It has been conventionally known that the visual system of a higher animal has spatial frequency characteristics on a band-pass basis. Specifically, it is known that the visual system has low sensitivity to low and high frequency components and that it is difficult for a person to detect a difference between two images even if there are some differences in high and low frequency components if band-pass components among spatial frequency components of those images are well matched. Further, experiments for comparing chromaticity components and luminosity components have revealed that chromaticity components have peak sensitivity at lower frequency components. This means that a difference between chromaticity components can be easily discriminated on images which are considerably blurred and, conversely, it is difficult to discriminate a difference of luminosity components as long as there is a sufficient match between their higher frequency components.

The present invention is based on such a finding on the spatial frequency characteristics of the human visual system. Specifically, chromaticity components and luminosity components are filtered at different peak frequencies, and the color of pixels out of the color gamut of an image of interest and the colors of pixels in the vicinity of a pixel of interest are compressed so as to minimize the color difference between images expressed by the square norm of the same. According to the process, not only the pixels out of the color gamut but also the pixels in the vicinity thereof are subjected to color adjustment. However, luminosity and chromaticity are separately corrected so as to achieve matching of suitable frequency components on a visual sensitivity as at a higher level as possible. This makes it possible to achieve color gamut mapping conceived taking the spatial frequency characteristics of images into consideration, which can be adjusted to suppress differences to a level almost imperceptible to human eyes.

According to the color gamut mapping according to the invention conceived taking the spatial frequency characteristics of images into consideration, bi-directional color conversion of colorimetric values and device values at each pixel is performed between images using a neural network obtained through learning. As used herein, the term "bi-directional color conversion" means a process of converting colorimetric values into device values (color separation values) and a process of reconverting the device values into colorimetric values. Further, there is a condition as described above that it is required to minimize the sum of an image obtained by thresholding the norm of the colorimetric values of an image before and after conversion and an image obtained by applying spatial filters having different peak frequencies for luminosity components and chromaticity components to the square norm of an original image and a colorimetric value image obtained after bi-directional color conversion. However, details of such a requirement will be described later.

An apparatus for color gamut mapping that takes account of the spatial frequency characteristics of images according to an embodiment of the present invention will now be described with reference to the accompanying drawings.

The functional configuration of the apparatus for gamut mapping according to the present embodiment of the invention is shown in FIG. 1. As shown in FIG. 1, the apparatus for color gamut mapping comprises an input section 10, a color gamut mapping portion 20, and an image output section 30.

The input section 10 receives an image input signal externally supplied and outputs a colorimetric value image corresponding thereto as an electrical signal. The image output section 30 is an output device for outputting an image to display or on a piece of paper in accordance with device values input thereto which may be an output device such as an electrophotographic printer or color display for color DTP (desktop publishing).

The color gamut mapping portion 20 comprises a control portion 21 for controlling the color gamut mapping apparatus as a whole, a converter section 22 constituted by two neural networks (NN1, NN2) 22a and 22b, a gamut extracting section 23 for extracting a color gamut by thresholding the norm of colorimetric values before and after bi-directional color conversion, a filter section 24 for applies a filter having different peak frequencies for luminosity components and chromaticity components to an image which is the difference between an image from the input section and an image obtained by bi-directional color conversion at the converter section to obtain the square norm thereof, an optimize section 25 for minimizing the sum of the outputs of the gamut extracting section and the filter section under a predetermined condition, and a memory 26 for storing various parameters associated with the converter section 22 and the filter section 24.

The control portion 21 controls the converter section 22, gamut extracting section 23, filter section 24, optimize section 25, and memory 26 and performs various processes associated with color gamut mapping including a learning process at the neural networks 22a and 22b. At the converter section 22, a learning process is performed to provide a conversion function to be described later. The gamut extracting section 23 performs a thresholding process on the norm of the difference between the images before and after the conversion at the converter section 22 on a pixel-by-pixel basis to determine whether the color of each pixel of the images is within a color gamut. The filter section 24 uses a filtering coefficient stored in the memory 26 to perform a filtering process on an image which is a difference between an image sent from the input section and an image obtained by the bi-directional conversion at the converter section 22 and calculates the square norm of the filtered image as a whole.

The optimize section 25 performs optimization so as to satisfy a condition that an evaluation function defined by the sum of the output of the filter section 24 and the output of the gamut extracting section 23 for the entire image is to be minimized, thereby providing an image for which color gamut mapping has been performed.

Figure 2:
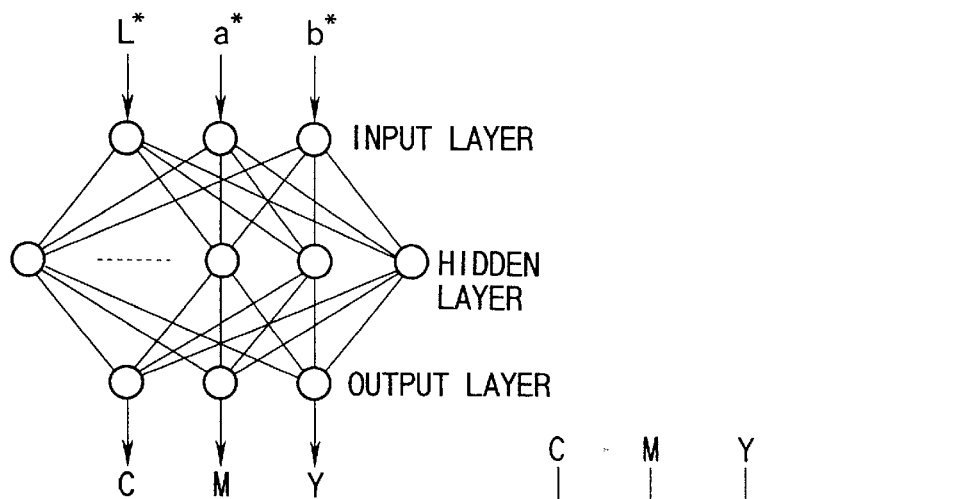
FIG. 2 is a schematic view showing an example of a configuration of feedforward type neural network for converting colorimetric values into device values used in the converter section shown in FIG. 1.

Further, the converter section 22 converts the initial electrical signal having arbitrary values (colorimetric values) into device values (color separation values) and further reconverts the result into colorimetric values. FIG. 2 shows an example of the neural network 22a used in the converter section 22, and FIG. 2 shows an example of the neural network 22b. While the neural network 22a has a function of converting at least three colorimetric values into at least three device values, the neural network 22b has a function of converting at least three device values into at least three colorimetric values. Such functions are realized through learning. The neural networks 22a and 22b shown in FIG. 2 and FIG. 3 have output units U1, U2, . . . , Un (n corresponds to a value used as a colorimetric value or device value or the number of colors) corresponding to colorimetric values and device values, respectively. The number of units in an input layer is 3. The number of units in an intermediate layer of the neural network 22a is 13. The number of units in an intermediate layer of the neural network 22b is 12. While the input/output characteristics of the output units of the neural network 22a are sigmoidal characteristics, the output units of the neural network 22b have linear characteristics. Further, the intermediate layers of both of the neural networks 22a and 22b comprises a neural circuit device whose input and outputs are in a relationship expressed by a sigmoidal function, and the input layer may be a linear neural circuit device. However, the number of the intermediate units can be adjusted in accordance with the characteristics of the color reproduction apparatus of interest.

The control portion 21 uses the converter section 22, gamut extracting section 23, filter section 24, and optimize section 25 to perform a thresholding process on the norm of a difference between electrical signals output by the converter section 22, i.e., the norm of a difference between images before and after bi-directional color conversion. Further, the control portion 21 optimizes the colorimetric values of pixels which have been determined to be out of the color gamut so as to minimize the evaluation function defined by the sum of values throughout an image which have been subjected to the thresholding process at the gamut extracting section 23 and the sum of the square norm of filtered differential images throughout the image. Such a process makes it possible to obtain an image which has been subjected to proper color gamut mapping.

The memory 26 stores a combination coefficient of three-layer feedforward type neural networks 22a and 22b which have been subjected to a learning process at the converter section 22 and a filtering coefficient used at the filter section 24.

Next, a detailed description will be made on the converter section 22 formed by two neural networks, filter section 24, gamut extracting section 23, and optimize section 25.

First, the converter section 22 will be described. The input section shown in FIG. 1 converts at least three colorimetric values of each pixel of an image are into corresponding electrical signals. Specifically, the input section 10 outputs electrical signals indicating the L*a*b* values, L*u*v*, or XYZ tristimulus values of colors before conversion of colorimetric values which are LCH values of a color appearance model.

At the converter section 22, the colorimetric values output from the input section are supplied as input to the neural network 22a shown in FIG. 2. With given colorimetric values, an output Hi of an intermediate layer unit of a neural network having the structure as shown in FIG. 2 is output as expressed by the following equation.

$$H_i = f(net_i) \quad (1)$$

$$net = \sum_{i=1}^{m}\sum_{j=1}^{n} W_{ij}^{(h)} I_j + b_i$$

where W(h)ij represents a combination coefficient for a j-th input unit and an i-th intermediate unit; Ii represent the output of the intermediate unit; and bj represents a bias value. An output Oi of an output layer unit is similarly output according to the following equation.

$$O_i = f(net_i) \quad (2)$$

$$net = \sum_{i=1}^{m}\sum_{j=1}^{n} W_{ij}^{(O)} H_j + b_i$$

where W(O)ij represents a combination coefficient for a j-th intermediate unit and an i-th output unit, and Hi represents the output value of an i-th intermediate unit defined by the above Equation (1). Further, n, m, k represent the number of units in the input layer, intermediate layer, and output layer, respectively.

At this point, the characteristics of the units in the input layers are characteristics such that an input is output as it is. The function f(x) for the intermediate layer units is characteristics expressed by a sigmoidal function which monotonously increased between [0, 1] defined by the following equation.

$$f(x) = \frac{1}{\{1+e^{-x}\}} \quad (3)$$

The output units have characteristics expressed by a sigmoidal function. However, the intermediate and output layers may receive input from a bias unit.

Figure 3:
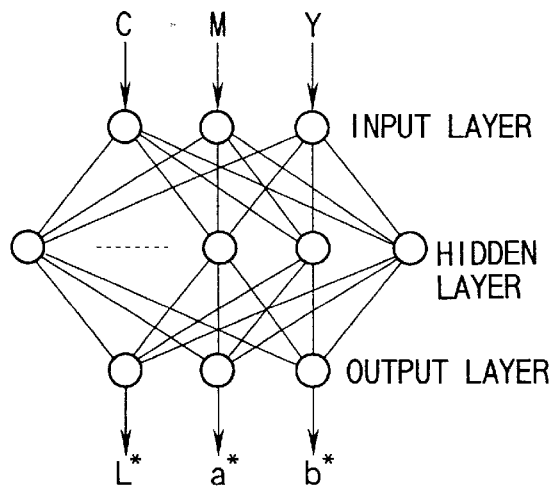
FIG. 3 is a schematic view showing an example of a configuration of feedforward type neural network for converting device values into colorimetric values used in the converter section shown in FIG. 1.

Next, device values obtained through color conversion at the neural network 22a shown in FIG. 2 are supplied as input to the neural network 22b shown in FIG. 3 and are converted into colorimetric values according to similar calculations indicated by the above Equations (1) and (2). The characteristics of the output units of the neural network shown in FIG. 3 may be a sigmoidal function or may De linear. In the case of the present invention, sigmoidal characteristics are preferred.

The combination coefficient for those two neural networks is learned and modified in advance such that the square error of the output of each output unit and a device value or a colorimetric value supplied as a teacher signal. The learning employs the back propagation algorithm proposed by Rumelhert or learning rules as an improved version of the same to learn conversion from colorimetric values into device values and from device values into colorimetric values. The combination coefficient of the neural networks which have finished learning is stored in the memory 26. A combination coefficient learned externally to the apparatus may be loaded to this memory. That is, it is not essential that the networks learn inside the apparatus, and it is possible to utilize a combination coefficient obtained by learning at another apparatus.

The filter section 24 will now be described. At the filter section 24, a filtering process is performed by applying a filter that exhibits different characteristics for luminosity components and chromaticity components to the difference between an original image from the input section 10 and an image output by the converter section 22. The filter section 24 outputs a perceptible difference PD (r, o) defined by the following equation as the square norm of a filtered value.

$$PD(r,o)=\|h*[o(x,y)-r(x,y)]\|^2 \quad (4)$$

Figure 4A:
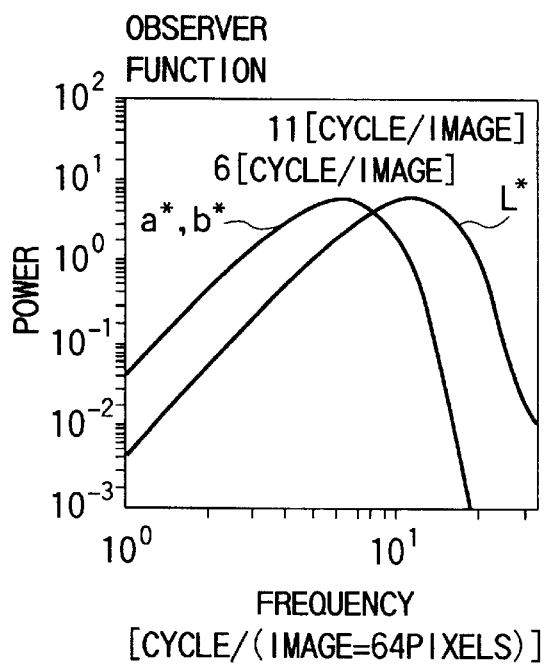
FIGS. 4A, 4B, and 4C are graphs representing the shape of the spatial filter used in the filter section in FIG. 1 on a one-dimensional basis.
Figure 4B:
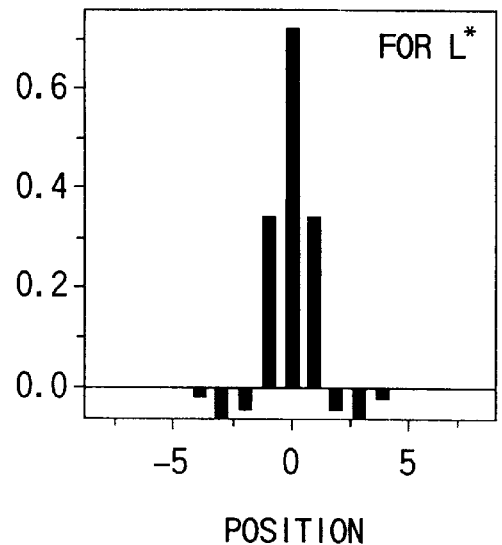
Figure 4C:
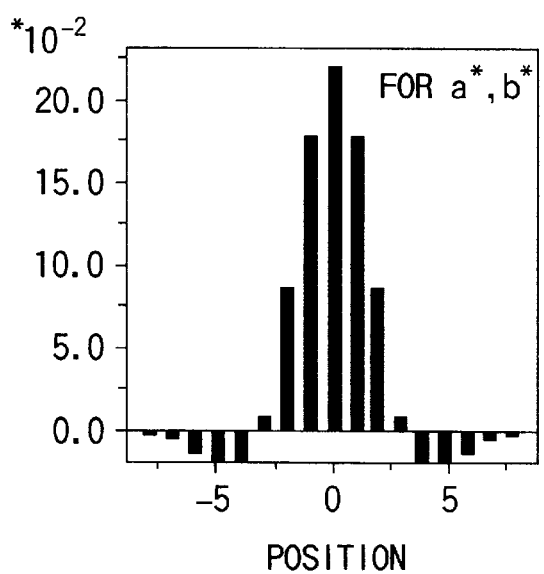

This can be rewritten in a differential form as follows.

$$PD(r, o) = \quad (5)$$

$$\sum_{c=L^*a^*b^*} \left\{ \sum_{i,j=-\omega}^{+\omega} h^c(i, j) \times (C_0(x-i, y-j) - C_r(x-i, y-j)) \right\}^2$$

where 2 ω+1 is the filter size. FIGS. 4A through 4C show a one-dimensional representation of the filter applied to luminosity components and chromaticity components. The filter utilizes a DOG function defined by the following Equation.

$$DOG(r, \sigma_e, \sigma_i) = \frac{1}{2\sigma_e}\exp\left(\frac{r^2}{2\sigma_e^2}\right) - \frac{1}{2\sigma_i}\exp\left(\frac{r^2}{2\sigma_i^2}\right) \quad (6)$$

$$r = \sqrt{x^2 + y^2}, \sigma_i/\sigma_e = 1.6$$

Figures 5A, 5B:
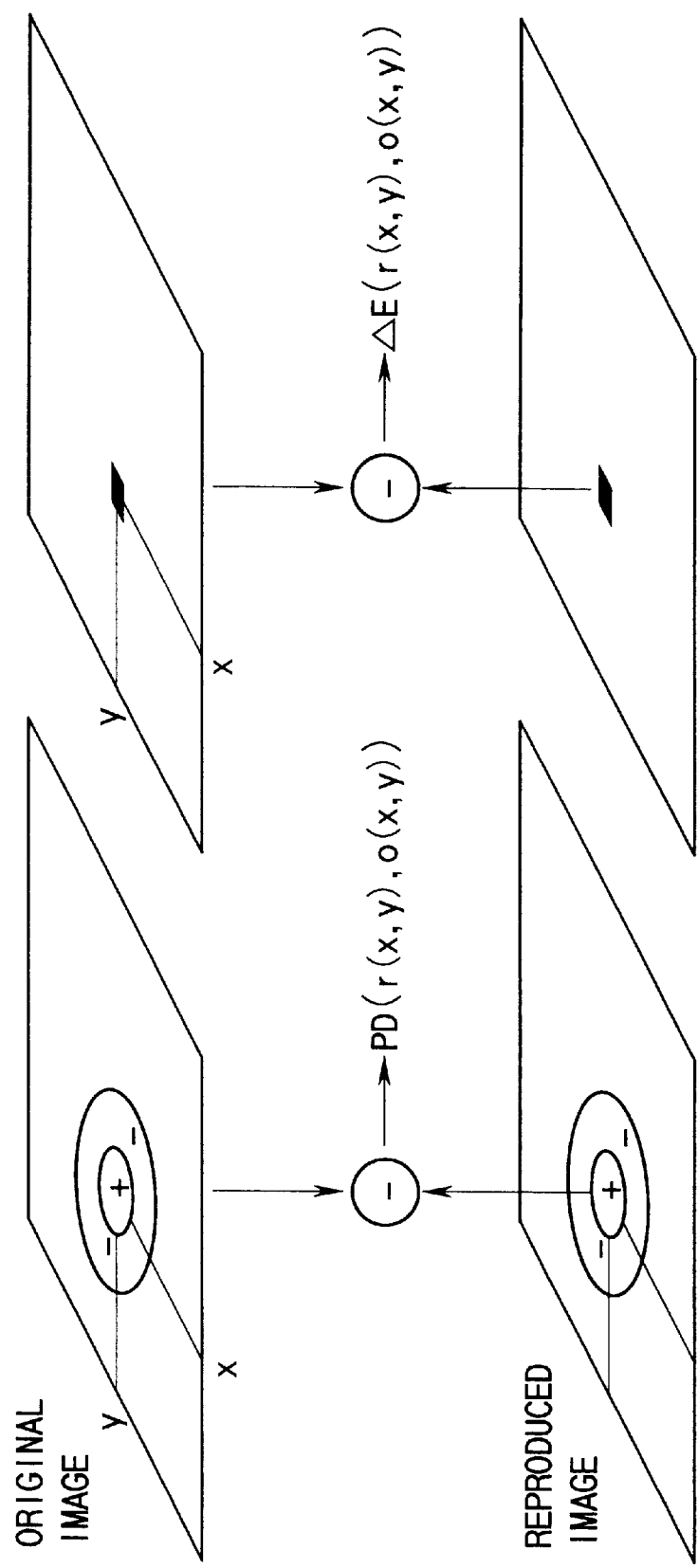
FIGS. 5A and 5B are conceptual views showing a difference between the amount of a perceptive difference in the embodiment and a color difference according to the prior art.

PD (r, o) in Equation 4 is a value corresponding to a CIE color difference which represents a color difference in general. FIGS. 5A and 5B show the difference between the CIE color difference and the perceptible difference PD (r, o). As apparent from those figures, while the CIE color difference represents a difference between corresponding pixels of an original image and a reproduced image, the perceptible difference PD (r, o) is a value generally representing a color difference between the corresponding pixel and pixels around the same.

Next, the gamut extracting section 23 will be described. The gamut extracting section 23 determined whether a pixel of interest is in or out of a color gamut by performing a threshold process T[.] on accuracy M(r) of the bi-directional color conversion at the converter section 3 expressed by the following equation.

$$M(r) = \|r - F_{NN2}(F_{NN1}(r))\| \quad (7)$$

The threshold process T[.] is defined by the following equation.

$$T[\cdot] = \begin{cases} 0 & \text{if } x < \text{threshold} \\ x & \text{otherwise} \end{cases} \quad (8)$$

The threshold is the maximum M(r) within the color gamut.

Figure 6A:
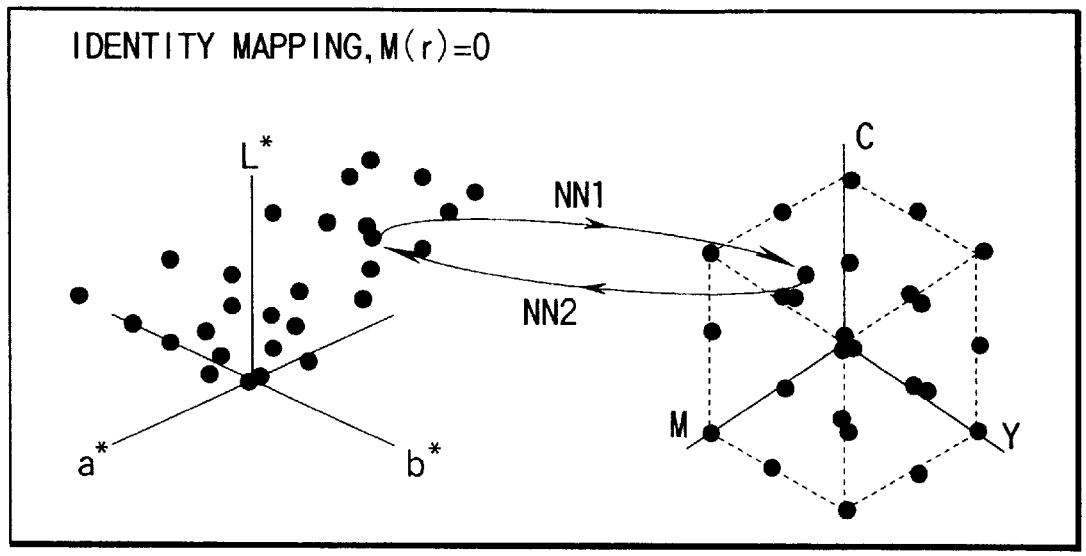
FIGS. 6A and 6B are conceptual views showing the principle behind extraction of a color gamut by means of bi-directional color conversion at the gamut extracting section shown in FIG. 1.
Figure 6B:
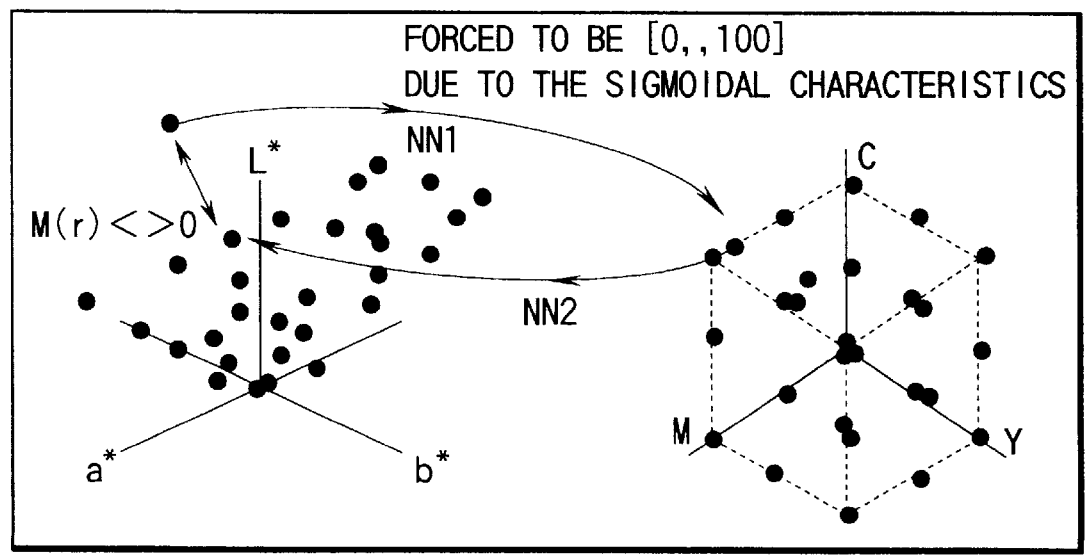
Figure 7A:
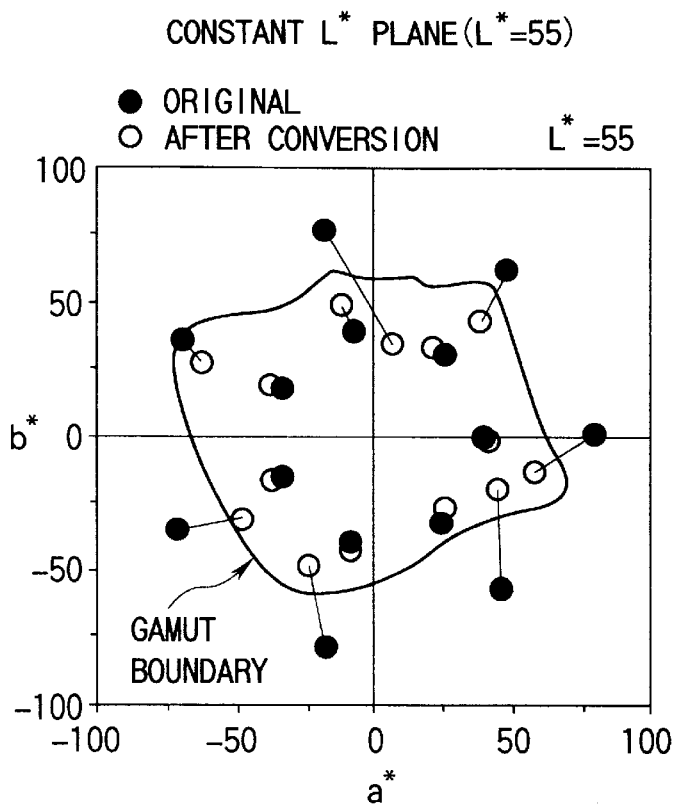
FIGS. 7A and 7B are schematic views showing the difference between a three-dimensional display of a color gamut of an actual printer used in the embodiment and conversion errors as a result of bi-directional color conversion in and out of a color gamut.
Figure 7B:
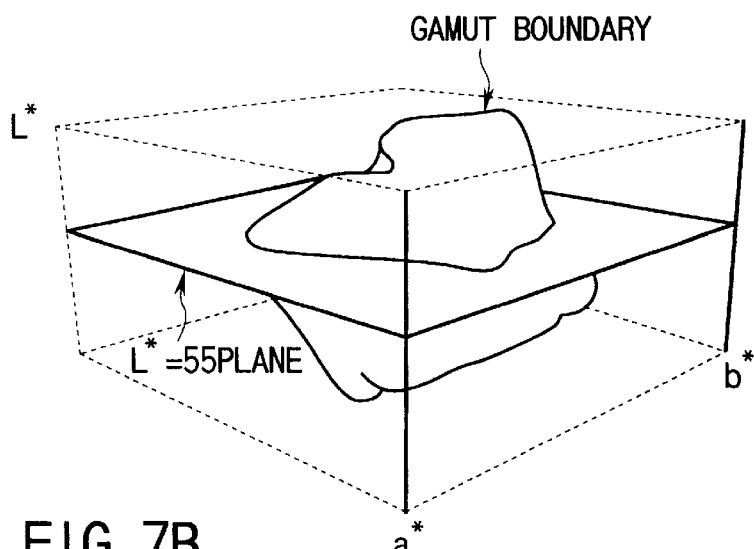

FIGS. 6A and 6B show the concept of the extraction performed at the gamut extracting section at this time. When bi-directional conversion between colorimetric values and device vales is performed, if an input colorimetric value is out of the color gamut, the value obtained by converting the colorimetric value into a device value will exceed the range of device values (from 0 to 255). However, since the output units of the neural network performing the conversion from colorimetric values into device values has sigmoidal characteristics, any value exceeding the range is put into the range from 0 to 255 by force. In this case, a value obtained as a result of reconversion of the device value into a colorimetric value will be completely different from the colorimetric value before the bi-directional color conversion. On the other hand, a colorimetric value within the color gamut is mapped to substantially the same point (within the range of the conversion accuracy) as that of the colorimetric value before the bi-directional conversion. The gamut extracting section determines whether a pixel of interest is within the color gamut or not on such a principle. FIGS. 7A and 7B show a three-dimensional representation of the result of actual extraction of the color gamut of a printer and the result of determination whether a color of interest is within the color gamut or not.

As shown in FIG. 7A, a color gamut generally has a very complicated shape, Further, as apparent from FIG. 7B, data located out of the color gamut have great conversion errors after bi-directional color conversion, and data within the color gamut conversely have small conversion errors which are within the range of conversion error.

The optimize section 25 will now be described. The optimize section 25 performs optimization utilizing the steepest descent method such that an evaluation function defined using PD (r, o) and T[M(r)] is minimized.

$$\text{Cost} = \sum_{x,y} PD(r,o) + \lambda \sum_{x,y} T[M(r)] \quad (9)$$

That is, a colorimetric value image r (x, y) is updated using the following equation.

$$r_{new} = r_{old} - \alpha \partial PD(r,o)/\partial_r \quad (10)$$

An image (device value) color gamut-mapped using this optimization process is sent to the output portion 30 as an arbitrary signal such as an electrical signal or optical signal and is output on to a piece of paper or a display as an output image.

Figure 8:
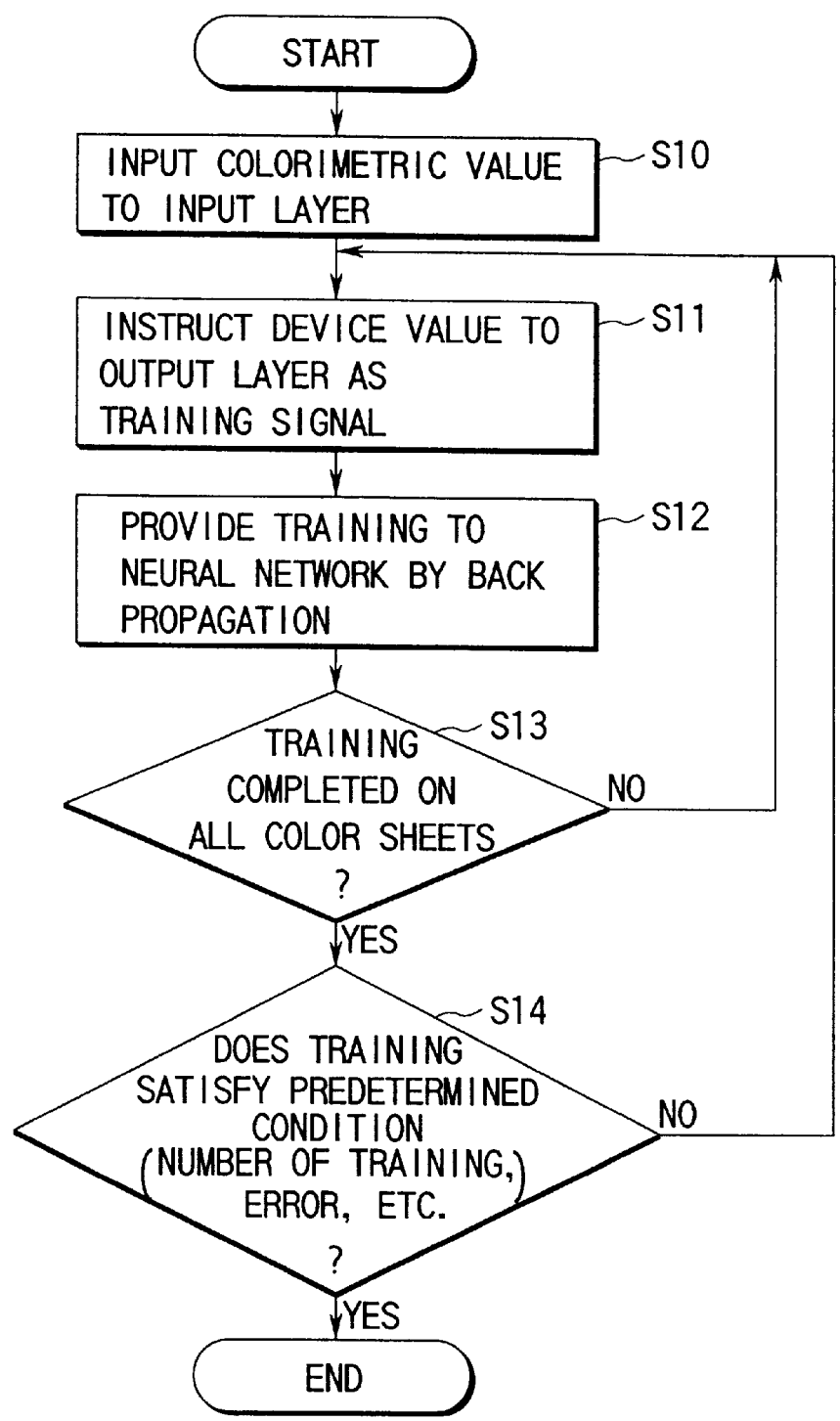
FIG. 8 is a flow chart showing a process of causing a three-layer feedforward type neural network in the embodiment to learn conversion of colorimetric values into device values.

The learning at the converter section 22 in the present embodiment will now be described. FIG. 8 shows the flow of the learning process at the converter section 22 constituted by neural networks. Since the two neural networks 22a and 22b of the converter section 22 learn quite similarly except that input and output are switched. Therefore, only the learning process at the neural network 22a shown in FIG. 2 will be described for simplicity.

In the present embodiment, each of CMY device values are first varied from 0% to 100% at intervals of 10%, and the color of 1331 color chips printed by a printer is measured using spectrophotometric colorimetry. A resultant spectral reflection factor is used to calculate L*a*b* which are in turn used as colorimetric values. Only 216 colors among such data are used as data for learning.

First, at least three colorimetric values are input to the input layer of the three-layer neural feedforward type network (step S10). Simultaneously, device values corresponding to the colorimetric values supplied to the input layer are supplied to the output layer as a teacher signal (step S11). Next, a learning process is performed based on the back propagation learning rules (step S12). The learning process at step S12 is performed on 216 color chips. Specifically, the strength of combination (combination coefficient) of the units in the neural network is changed such that the values output by the output layer become closer to the device values as teacher signals. Thereafter, it is determined whether the process has been performed on all of the 216 color chips (step S13). If not, the data is changed for the data of next group of color chips and the learning is repeated from step S10 (the answer at step S13 is NO). When all color chips are finished, the process proceeds to the next step (the answer at step S13 is YES).

Then, determination is made on the learning at step S12 to see if it has satisfied predetermined conditions for learning, e.g., whether the changing of combination coefficient has reached a predetermined number of times and whether the deviation of the values output by the output layer from the device values as a teacher signal is within a predetermined tolerance (step S14). If the predetermined conditions for learning are satisfied, the combination coefficient for the three-layer feedforward type neural network is saved in the memory 26 and the learning process is terminated (the answer at step S14 is YES). If the learning conditions are not satisfied, the learning process is repeated from step S10 (the answer at step S14 is NO).

Figure 9:
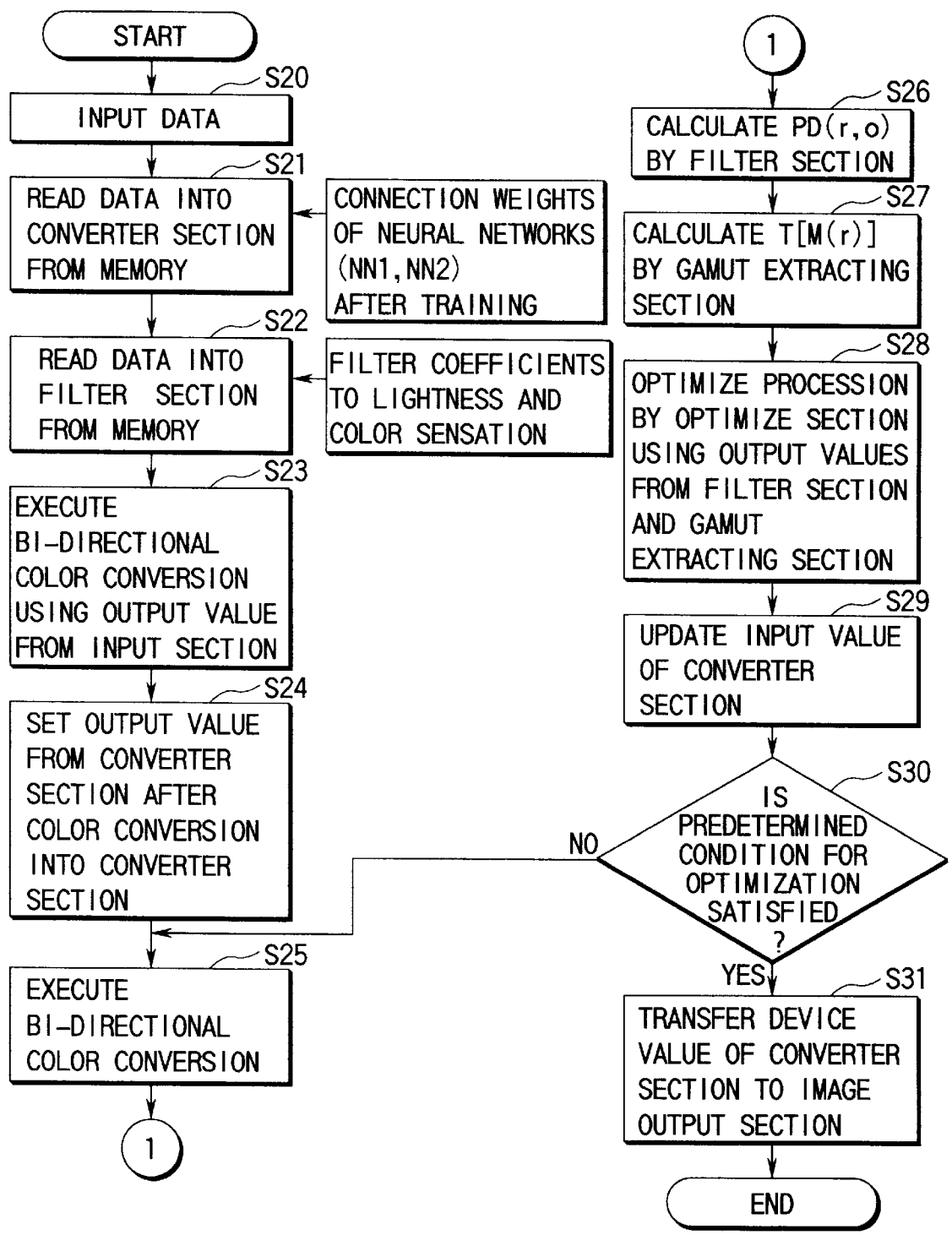
FIG. 9 is a flow chart showing a color gamut mapping process in the embodiment.

Next, a color gamut mapping process according to the present embodiment will be described with reference to the flow chart in FIG. 9.

A color gamut mapping process is performed on an image input to the input section 10 using the combination coefficient for each of the two neural networks obtained by the above-described learning process. This color gamut mapping process is carried out under the control of the control portion 21 as previously mentioned.

First, a colorimetric value image input from the input section 10 is sent to the color gamut mapping portion 20 (step S20). Next, at the color gamut mapping portion 20, the neural network combination coefficients and filter coefficient are loaded from the memory 26 to and set in the converter section 22 and the filter section 24, respectively (steps S21 and S22). The image from the input section 10 is subjected to bi-directional conversion at the converter section 22 (step S23), and the output is set as an initial input image of the converter section 22 (step S24). Next, another bi-directional conversion is performed at the converter section 22 to calculate a converter section output (step S26).

At the filter section 24, PD (r, o) is calculated from the outputs of the converter section and the input section 10 using Equation 4 (step S26). Meanwhile, T[M(r)] is calculated using Equations 7 and 8 from the images before and after the bi-directional conversion performed by the converter section 22 at the gamut extracting section 23 (step S27).

Figure 10:
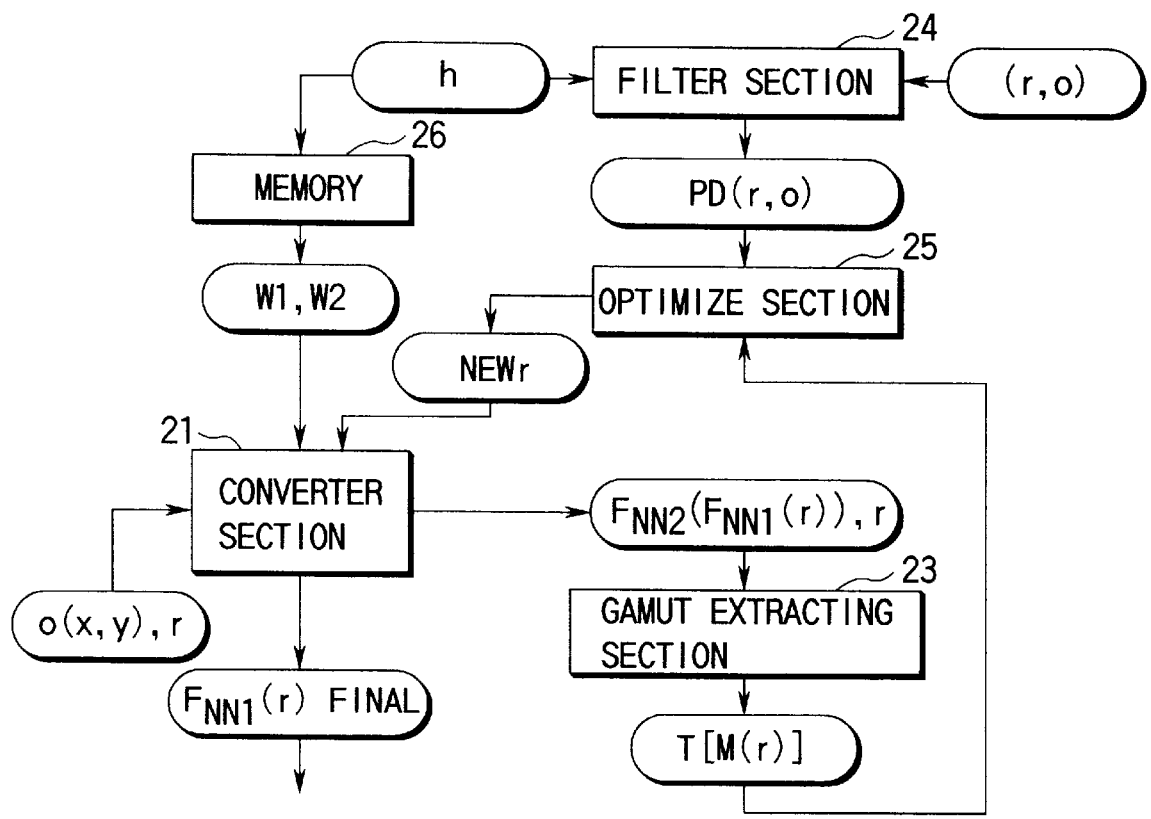
FIG. 10 illustrates the flow of various kinds of information (results of calculations) in the embodiment.

Thereafter, the optimize section 25 controls the input of the converter section 22 in the steepest descending direction of PD (r, o) such that the evaluation function defined using the output of the filter section 24 and the output of the gamut extracting section 23 is minimized (step S28). Next, it is determined whether the value of the evaluation function satisfies conditions for optimization. If not satisfied, the process are repeated from step S25 (the answer at step S30 is NO). If satisfied, the process proceeds to the next step (the answer at step S30 is YES). Then, a device value image obtained by converting the input of the converter section 22 using the first neural network 22a is transferred to the output portion. The flow of information (data) in this color gamut mapping process is shown in FIG. 10.

Figure 13:
FIG. 13 shows a photograph displayed on a display used for a process of creating a graph showing a decrease in the evaluation function in the embodiment.

FIGS. 11A through 11D and FIGS. 12A through 12D show how the value of the evaluation function decreases as a result of the optimization process during an actual color gamut mapping process performed on an image of interest (FIG. 13). The regions blacked out in the image in FIGS. 11A through 11D indicate regions which can not be reproduced by the color reproduction apparatus. Each of FIGS. 11A through 11D shows L* component (luminosity), a*, b* components (chromaticity components) and the sum of them (the evaluation function as a whole). FIGS. 12A through 12D show how each of PD(r, o) and T[M(r)] changes. It is apparent from FIGS. 11A through 11D that the value of the evaluation function monotonously decreases as a result of the optimization process. Color gamut mapping of an input image is carried out through such processes.

Figure 14:
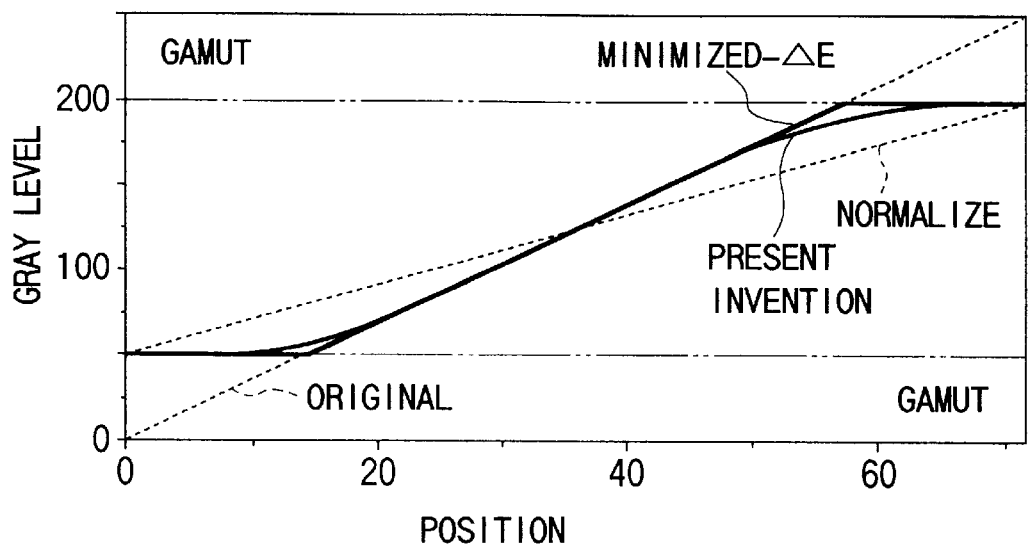
FIG. 14 is a graph which compares the results of the process of the apparatus for color gamut mapping according to the embodiment with the results of mapping according to the prior art on a one-dimensional basis.

In order to clarify the difference between the color gamut patting according to the invention and conventional methods, FIG. 14 shows the result of color gamut mapping performed using each method on a one-dimensional basis. Here, minimized ΔE method and normalization method are used as prior methods for comparison. According to minimized ΔE method, pixels out of the color gamut are all mapped on to the border lines of the color gamut, and pixel values within the color gamut are mapped to the same points as the original. According to normalization method, although the color gamut is mapped so that all pixel values are changed so as to form a complete straight line, contrast is reduced compared to the original. Meanwhile, the mapping according to the method of the present invention results in a sigmoidal line. Although such line can be similarly obtained by non-linear mapping on a pixel-by-pixel basis, the present invention is significantly different from this in that, according to the inventive method, the degree of correction varies depending on how a pixel of interest is distributed in the image. This is advantageous not only in that points out of the color gamut are forced into the gamut but also in that points inside the color gamut are corrected such that the contrast is maintained.

Figure 15A:
FIGS. 15A and 15B show the result of comparison of the difference in images of color differences between an original image and a reproduced image obtained using the apparatus for color gamut mapping of the embodiment and a conventional method.
Figure 15A:
Figure 15B:
Figure 15B:
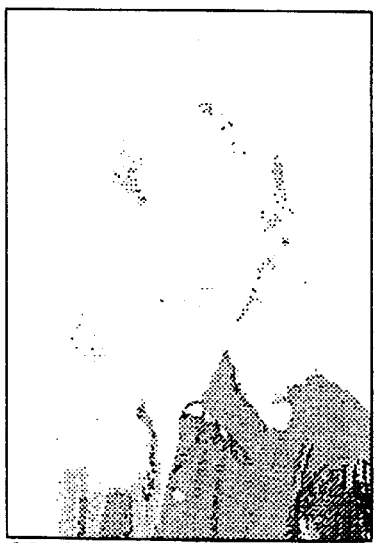

FIGS. 15A and 15B show the result of comparison of the difference in images of color differences between an original image and a reproduced image obtained through color gamut mapping using the inventive method and the minimized ΔE method.

FIG. 15A shows a reproduced image and an image of color difference according to the present invention, and FIG. 15B shows a reproduced image and an image of color difference according to the minimized ΔE method. In the images of color difference, the greater value of a region, the darker appears the region. Those images of color difference show that the minimized ΔE method shows color differences only in regions out of the color gamut and that the inventive method produces color differences not only in regions out of the color gamut but also in regions within the color gamut to produce a rather faint image of color difference, which means that contrast is maintained in the reproduced image. Further, since the inventive method optimizes the filtering process such that errors in medium frequency components is reduced, it reduces errors in medium frequency components compared to the minimized ΔE method.

Figure 16:
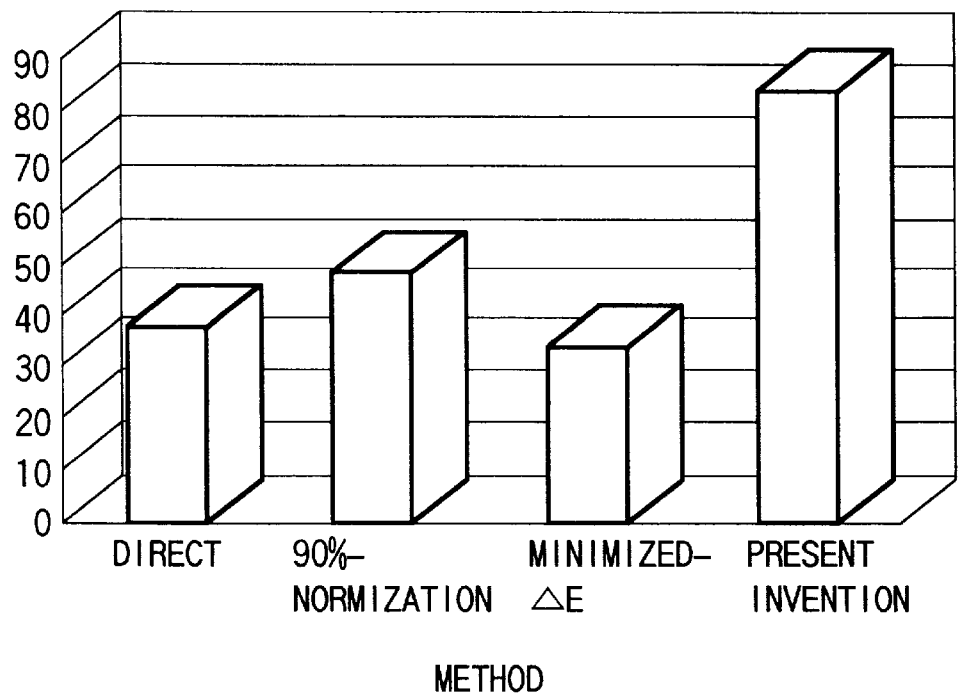
FIG. 16 is a graph showing the result of determination made on a paired comparison basis by some subjects on images which have been subjected to color gamut mapping according to apparatus for color gamut mapping of the embodiment and three conventional methods to find the method for color gamut mapping that provides the most preferable image.

In order to find the method that provides the best appearance in practice, FIG. 16 shows the result of determination made by some subjects on images which have been subjected to color gamut mapping according to prior methods and the inventive method on a paired comparison basis. The prior methods used were the direct method wherein colorimetric values are converted by a neural network into device values and are directly output to a printer as they, the 90% normalization method wherein colorimetric values of an image are converted by a neural network into device values after compressing saturation components thereof by 90% and are output to a printer, and the minimized ΔE method.

There is shown percentages representing the percentage of the subjects who regarded the image obtained by each method most preferable. In this case, the percentages indicating preference to those methods were 37%, 47%, 33%, and 83%, respectively, and it is apparent from such a result that most subjects regarded the image obtained by color gamut mapping according the inventive method most preferable.

As detailed above, according to the present invention, by taking advantage of a learning function of a neural network, highly accurate bi-directional conversion can be achieved between colorimetric values of an image and device values represented by CMY values, CMYK values, or RGB values regardless whether the image has L*a*b* values defined by CIE, L*u*v* values, XYZ values, or LCH values for a color appearance model. Further, a generalizing function of a neural network which has sufficiently learned makes it possible to provide an output adequate for the input data even if unknown data which have not been used for learning are input.

In addition, a filtering process for accommodating the spatial frequency characteristics and color extraction by means of bi-directional color conversion utilizing the characteristics of output units of a neural network are employed to achieve a highest possible level of matching of spatial frequencies to which the human visual system is most sensitive, i.e., to maintain the contrast of an image and to map the image to the colorimetric values which are as closest to the original colorimetric values as possible. As a result, it is possible to achieve very reliable color gamut mapping which has not been available in the past, thereby allowing an image to be reproduced with the most preferable appearance.

The above-described embodiment may be modified within the scope of the teaching of the present invention.

Figure 17:
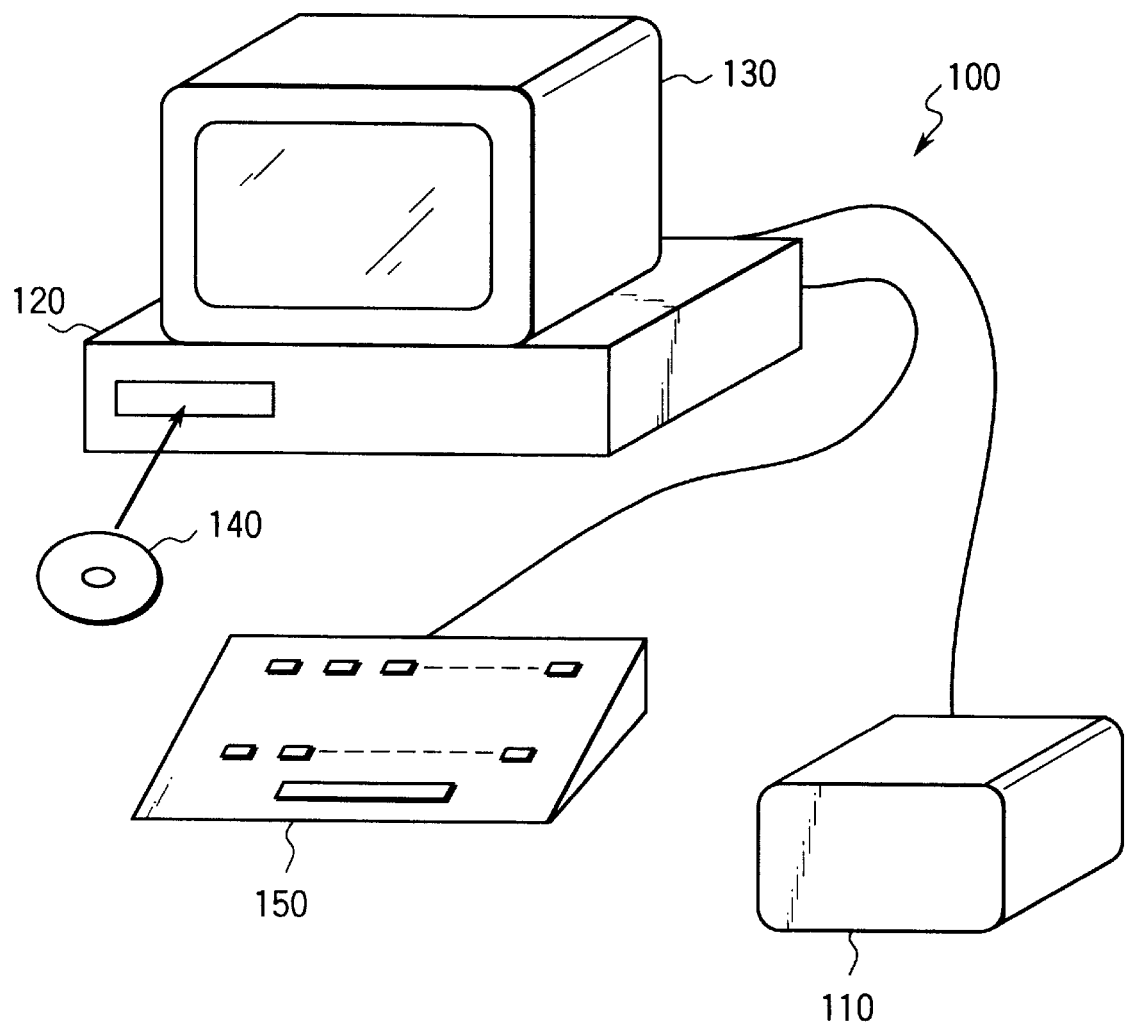
FIG. 17 is a perspective view of a computer system for color gamut mapping according to a modification of the present invention.

For example, the present invention can be achieved by software stored on a computer-usable medium. FIG. 17 is a perspective view of such a general computer system that is specially configured by executing the software according to this modification.

The computer system includes a input device 110, a computer unit 120, a display 130, and a keyboard 150. An spectrophotometer can be applied to the input device 110. The computer unit mounts a CD-ROM drive (not shown). Program code instructions are stored in a CD-ROM 140 which are read by the CD-ROM drive. The read-out instructions are executed by a CPU of the computer unit 120. The CPU performs processing as shown in FIG. 9.

The CD-ROM 140 is a computer-readable memory. The computer-readable memory includes any instruction storage device, such as, magnetic disks (floppy disks), optical disks including DVDs, magneto optical disks such as MOs, semi-conductor memory cards such as PC cards and other types of media.

This modification can yield results as same as that of the above embodiment.

The color difference used for the above-described evaluation function is defined by a point spread function about pixel of interest for a difference between an original image and an image obtained by the bi-directional conversion in the above-described conversion step (reproduced image) or an impulse response. It may be defined not only by the color difference of the pixel of interest between the original and reproduced images by also by the contrast between the pixel of interest and the pixels surrounding the same.

Further, as the function indicating whether the color of a pixel of interest in a color gamut used in the above-described evaluation function, a threshold function for the difference between colorimetric values before and after the bi-directional color conversion.

Furthermore, as the colorimetric values as described above, it is possible to use any of X, Y, Z tristimulus values defined by CIE (Commission Internationale de l'Eclairage) as colorimetric values, L*a*b* values, or L*u*v* values that form a color image, or colorimetric values defined by a color appearance model for predicting color appearance.

In addition, the color separation values (device values) described above may be three primary colors for additive color mixture having R (red), G(green) and B (blue) values that form a color image, or three primary colors for subtractive color mixture having C (cyan), M (magenta) and Y (yellow) values or C (cyan), M (magenta), Y (yellow) and K (black) values.

Moreover, the method of optimization may be either the steepest descent method or the non-linear optimization which is popular as a method for searching extreme values.

The neural network as described above may have a configuration that provides a learning function that provided the output units with sigmoidal input/output characteristics or linear characteristics.

Furthermore, the frequency characteristics of the above-described point spread function or impulse response may be band-pass characteristics.

Additional advantages and modifications will readily occur to those skilled in the art. Therefore, the invention in its broader aspects is not limited to the specific details and representative embodiment shown and described herein. Accordingly, various modifications may be made without departing from the spirit or scope of the general inventive concept as defined by the appended claims and their equivalents.

We claim:

1. A method for color gamut mapping comprising the steps of:

converting a colorimetric value of an original image to a device value of an output device in which colorimetric values of the original image outside a gamut of the output device are converted to device values within the gamut;

inversely-converting the device value obtained by said converting step to a second colorimetric value;

extracting the gamut by performing a threshold process with respect to a norm between the colorimetric value of the original image and the second colorimetric value;

filtering a color difference between the original image and an image to be output by said output device which is formed of the second colorimetric value obtained by said inversely-converting step with a spatial frequency filter; and optimizing the image to be output by said output device so as to minimize an evaluation function related to a sum of the gamut from said extracting step and a filtered difference from said filtering step, thereby providing an image for which color gamut mapping has been performed.

2. The method according to claim 1, wherein said converting and inversely-converting utilize either a feedforward neural network or a look-up table (LUT), and the feedforward neural network includes at least three layers.

3. The method according to claim 1, wherein the color difference is defined by an impulse response or a point spread function about a target pixel of the color difference between the original image and an image to be output by said output device and defined by a contrast between the target pixel and pixels surrounding the target pixel.

4. The method according to claim 1, wherein the threshold process uses a threshold function for the norm.

5. The method according to claim 1, wherein the colorimetric value is one of a XYZ tristimulus value, L*a*b* value, and L*u*v* value, said colorimetric value being defined by one of a CIE (Commission Internationale de l'Eclairage) and a color appearance model for predicting color appearance.

6. The method according to claim 1, wherein the device value represents the distribution of R (red), G (green) and B (blue) as three primary colors for an additive color mixing.

7. The method according to claim 1, wherein the device value represents the distribution of C (cyan), M (magenta) and Y (yellow), or, C (cyan), M (magenta), Y (yellow) and K (black), as three primary colors for a subtractive color mixing.

8. A color gamut mapping apparatus comprising:

a first converter for converting a colorimetric value of an original image to a device value of an output device in which colorimetric values of the original image outside a gamut of the output device are converted to device values within the gamut;

a second converter for inversely converting the device value obtained by said first converter to a second colorimetric value;

a color gamut extractor for extracting the gamut by performing a threshold process with respect to a norm between the colorimetric value of the original image and the second colorimetric value;

a filter for filtering a difference between the original image and an image which is formed of a second colorimetric value obtained by said second converter to be output by said target output device with a spatial frequency filter; and an optimizer for optimizing the image to be output by said output device so as to minimize an evaluation function indicated by a sum of the gamut from the color gamut extractor and a filtered difference calculated by the filter, thereby providing an image for which color gamut mapping has been performed.

9. The apparatus according to claim 8, wherein said first converter and said second converter comprise either a feedforward neural network or a look-up table (LUT), and the feedforward neural network includes at least three layers.

10. The apparatus according to claim 8, wherein the colorimetric value is one of a XYZ tristimulus value, L*a*b* value, and L*u*v* value, said colorimetric value being defined by one of CIE (Commission Internationale de l'Eclairage) and a color appearance model for predicting color appearance.

11. The apparatus according to claim 8, wherein the device value representing the distribution of R (red), G (green) and B (blue) as three primary colors for an additive color mixing.

12. The apparatus according to claim 8, wherein the device value represents the distribution of C (cyan), M (magenta) and Y (yellow), or, C (cyan), M (magenta), Y (yellow) and K (black), as three primary colors for a subtractive color mixing.

13. A computer-readable memory for color gamut conversion comprising:

a first instruction set readable by a computer for converting a colorimetric value of an original image to a device value of an output device in which colorimetric values of the original image outside a gamut of the output device are converted to device values within the gamut and inversely-converting the device value obtained by said converting to a second colorimetric value;

a second instruction set readable by a computer for extracting the gamut by performing a threshold process with respect to a norm between the colorimetric value of the original image and the second colorimetric value;

a third instruction set readable by a computer for filtering a color difference between the original image and an image to be output by said output device which is formed of the second colorimetric value obtained by said inversely-converting with a spatial frequency filter, and optimizing the image to be output by said output device so as to minimize an evaluation function related to a sum of a gamut from said extracting and a filtered difference thereby providing an image for which color gamut mapping has been performed.

14. The computer-readable memory according to claim 13, wherein the evaluation function is defined by a color difference based on spatial frequency characteristics of the original image and by a function indicating whether or not a target color is positioned in a color gamut defining colors which can be reproduced by the output device.

15. The computer-readable memory according to claim 13, wherein the first instruction set utilizes one of a feedforward neural network and a look-up table (LUT), and the feedforward neural network includes at least three layers.

16. The computer-readable memory according to claim 13, wherein the color difference is defined by impulse response or a point spread function about a target pixel of the color difference between the original image and an image to be output by said output device and defined by contrast between the target pixel and pixels surrounding the target pixel.

17. The computer-readable memory according to claim 13, wherein the threshold process uses a threshold function for the norm.

18. A color gamut conversion method comprising the steps of:

converting from an original image a first colorimetric value outside a gamut of an output device to a second colorimetric value based on a color separation value within the gamut of the output device;

performing a threshold process on a norm of a difference between said first and second colorimetric values;

filtering a color difference between the original image and a reproduced image formed from the second colorimetric value to obtain a perceptible difference that is a color difference between corresponding pixels of the original image and the reproduced image and pixels around the corresponding pixels; and completing the color gamut conversion through optimization to minimize an evaluation based on a sum of an image from said step of performing and an image from said step of filtering.

* * * * *